United States Patent
Buschbom et al.

[15] 3,695,234
[45] Oct. 3, 1972

[54] MATERIAL HANDLING APPARATUS WITH DIVERTER MEANS

[72] Inventors: Floyd E. Buschbom, Long Lake; Roger L. Johnson, Wayzata, both of Minn.

[73] Assignee: Veda, Inc., Long Lake, Minn.

[22] Filed: Oct. 2, 1970

[21] Appl. No.: 77,668

[52] U.S. Cl. ............................................... 119/52 B
[51] Int. Cl. ............................................... A01k 05/00
[58] Field of Search ...... 119/52 B, 56, 51.11; 198/67, 198/68

[56] References Cited

UNITED STATES PATENTS

| 3,464,390 | 9/1969 | Ferris et al. | 119/56 R |
| 3,428,027 | 2/1969 | Haen et al. | 119/52 B |
| 3,443,547 | 5/1969 | Ferris et al. | 119/52 B |

*Primary Examiner*—Hugh R. Chamblee
*Attorney*—Donald R. Sjostrom and Robert P. White

[57] ABSTRACT

A material handling apparatus especially for handling livestock feed or the like and including a carriage movable along a fixed track and having a movable conveyor on the carriage so that it receives material and distributes it along the length of a bunk or the like as the carriage moves back and forth along the track. A diverter is disposed so that material handled by the carriage and the conveyor thereon is deposited first onto the diverter and is guided thereby either to one or the other of two longitudinal sections in the feed bunk or the like, depending upon the angle or position of the diverter. In an example disclosed, material is deposited from either one end or the other of the carriage and a diverter is located at each end thereof. A remotely controlled apparatus is provided for switching the diverter from one position to the other so that the feed or other material may be deposited selectively in one or the other of the longitudinal sections of the bunk. The switching apparatus includes cam means including a stationary means and a means movable with each of the diverters. The stationary means includes a means movable between first and second operating positions cooperable with the means movable with the diverters to move the diverters to one or the other of their positions and to maintain them in such position until the means associated with the stationary means is moved to its other operating position.

17 Claims, 8 Drawing Figures

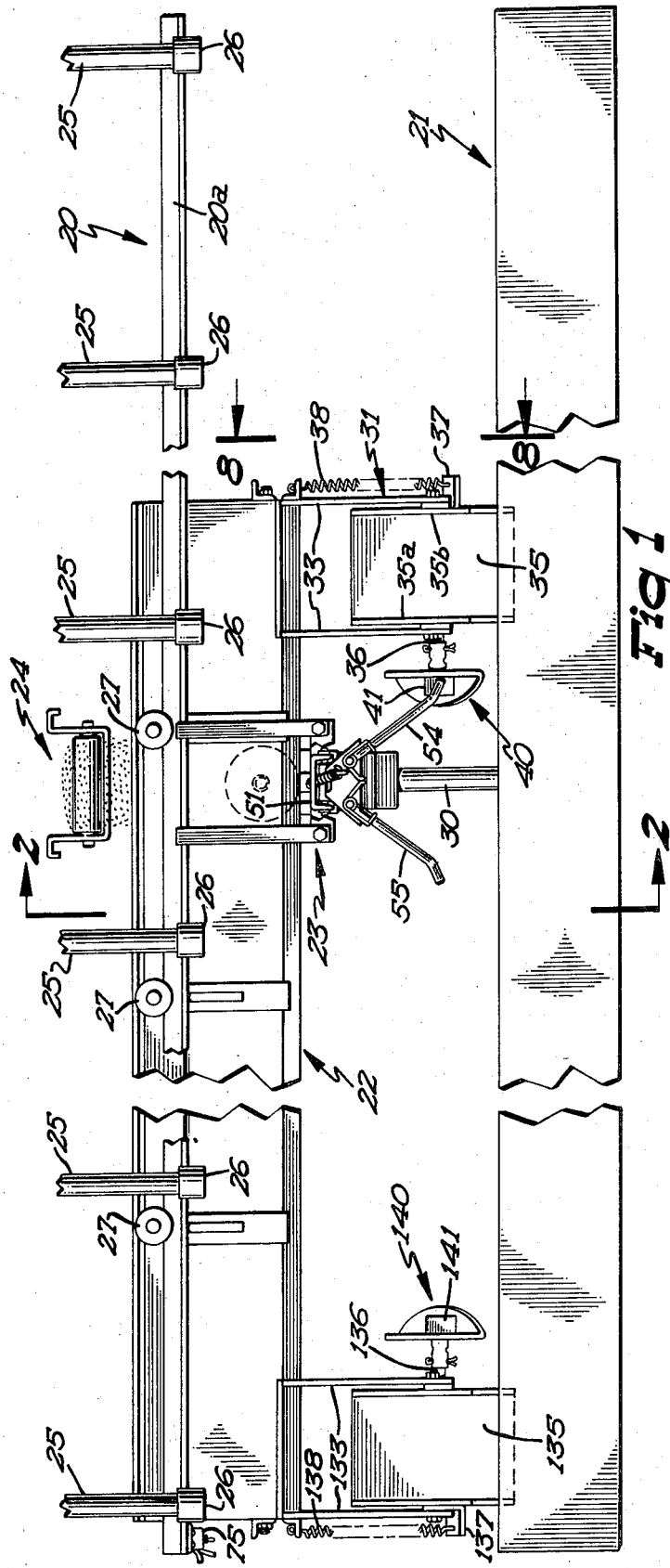

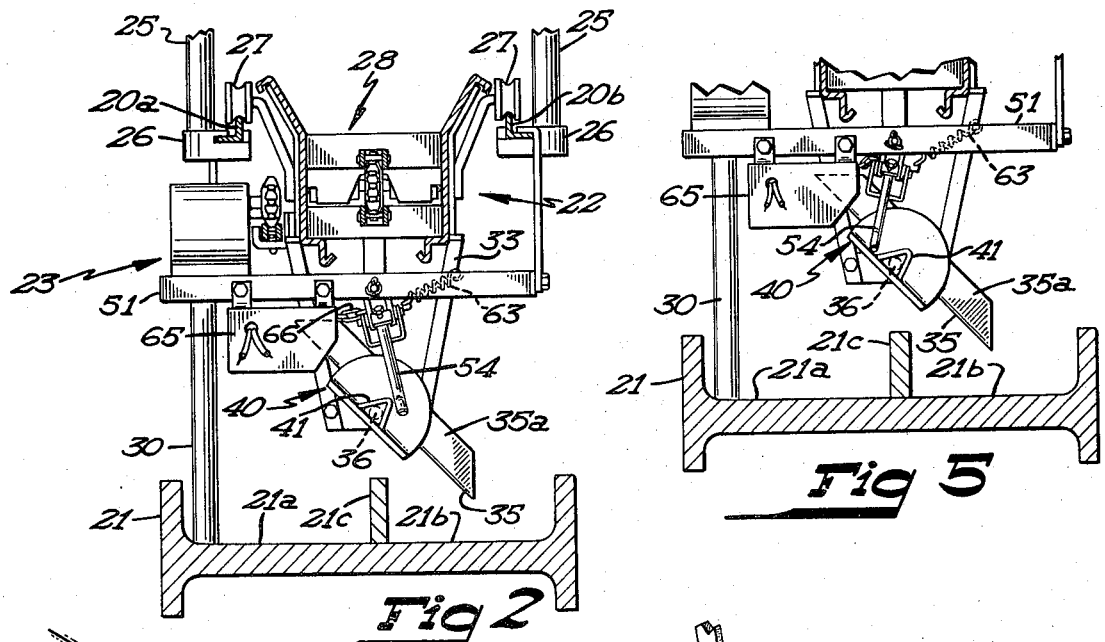
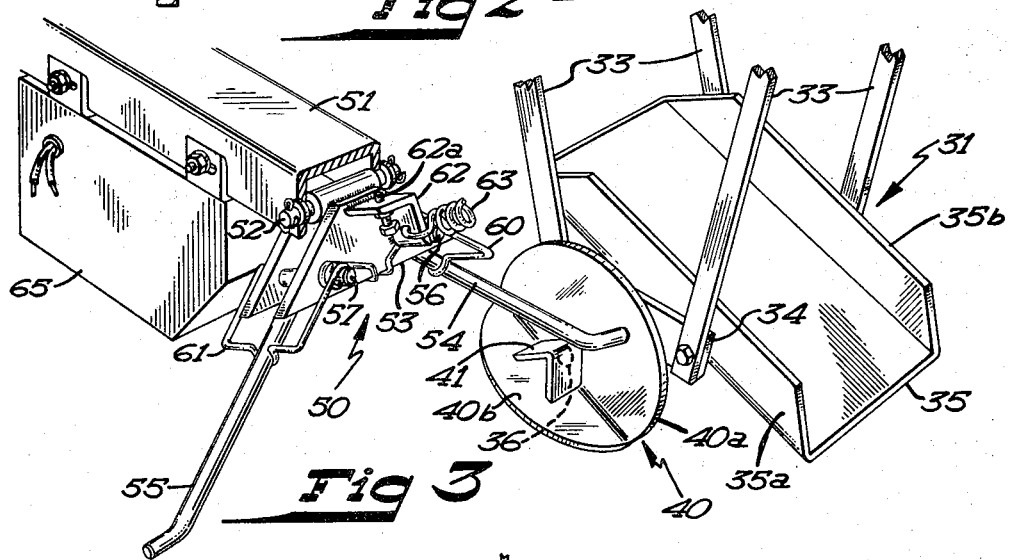
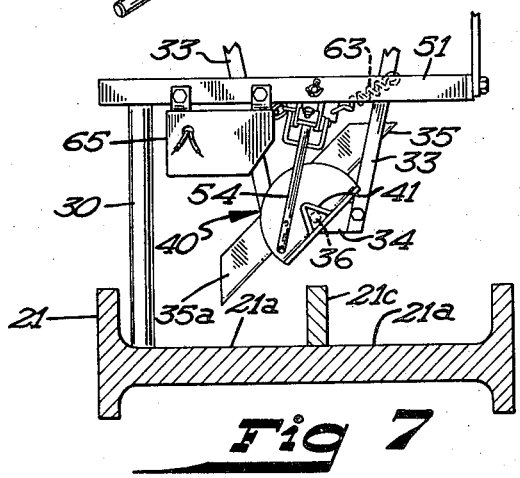
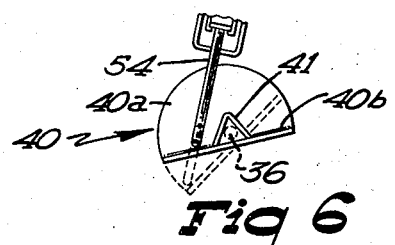

MATERIAL HANDLING APPARATUS WITH DIVERTER MEANS

BACKGROUND OF THE INVENTION

Livestock feeding apparatus of the type having a moving carriage mounted on a fixed track and with a movable conveyor on the carriage have been rather extensively used recently. One such feeder apparatus is disclosed in detail in the co-pending application Ser. No. 8199 of Floyd E. Buschbom, Glen D. Hansen and Roger L. Johnson. The feeder disclosed in that application has a fixed drive motor mounted generally at the mid point of the track and it drives the carriage back and forth along the track. The conveyor on the carriage is fixed at one point with respect to the track so that the movement of the carriage causes relative movement between the conveyor and the carriage. Other arrangements are known of this general type of feeder. At least one commercially available feeder has the motor move with the carriage.

This type of feeder is disposed above an elongated feed bunk and as the carriage moves back and forth along the track it deposits feed in the bunk. The feed is initially supplied to the carriage at a point approximately at the center or midpoint of the track and the carriage itself is generally just slightly longer than one half the length of the track so that a portion of the carriage is always disposed underneath the feed supply point regardless of the position of the carriage on the track. The carriage moves along the track and at the same time the conveyor moves with respect to the carriage so that feed is dumped off the carriage at one end or the other thereof, depending upon the direction in which the carriage is moving.

In many feed installations a single feeder is used to provide feed to livestock in two or more separate lots. Often this is accomplished by having the feeder and the feed bunk located between the two lots and with the feed bunk divided into two separate longitudinal sections separated by a longitudinal divider running down the middle of the bunk. Feed can be supplied to both sides of the bunk by a single feeder with this arrangement. However, often it is desired to feed the livestock in the two different lots different rations. In order to do this, movable diverters have been added to the carriage, generally one disposed at either end of the carriage and in a position where feed being dumped by the conveyor on the carriage will first be deposited onto the diverter. These diverters are generally movable so that they will deflect the feed to one side or the other of the bunk.

Since these feeders may be relatively long, sometimes several hundred feet, and since often the feed lot may be muddy and very dirty and undesirable to do any unnecessary walking in, there has been a need for a simple and reliable means for remotely changing the position of these diverters so that the operator does not have to walk out into the feed lot and manually change their positions. If such a remote control device is to be effective and marketable, it must be simple and reliable and also relatively inexpensive. Various attempts have been made to provide remote control for such diverters but heretofore they have not been completely satisfactory.

BRIEF SUMMARY OF INVENTION

This invention provides control apparatus for controlling the position of one or more diverters used in connection with a movable material handling apparatus such as the livestock feeder apparatus described above. The control apparatus is relatively simple and inexpensive to manufacture and install and is particularly adaptable to remote control by means of a simple electrical switch. It provides means for automatically moving one or more diverters to a predetermined position and then permitting normal operation of the device with the diverter in that position until the control is operated to a second condition where it moves said diverter to its second predetermined position, where it is maintained until the control means is again operated to its first position to move the diverter back to the first predetermined position. Specifically, the control means includes a cam means including first and second cooperating cam means, the first of such cam means being stationary with respect to the path of travel of the carriage and the second being movable with the carriage and the diverter means. The first and second cam means are disposed so they intersect and engage at a predetermined position of the carriage and diverter along their path of travel and the cam means are cooperable upon such engagement to move the diverter means from one of its positions to another. The stationary cam means is operable between first and second operating positions. The movable cam means are constructed for cooperation whereby engagement between the movable and stationary cam means when the stationary cam means is in the first of its operative positions affects movement of the diverter to a first of its positions when it is disposed in the other of its positions and so when the stationary cam means is disposed in its second operating position, cooperation between the stationary and movable cam means affects movement of the diverter from its first to its other position. Preferably the stationary cam means is operably connected to a remotely controlled operating means which is effective to dispose the stationary cam means in either its first or its second operating position. In a preferred arrangement this operator is an electrically operable solenoid which is energizable and then overcomes the force of a spring which normally maintains the stationary cam means in a first predetermined position.

An object of the invention is to provide an improved means for selectively positioning a diverter used in connection with material handling means such as an animal feeder or the like.

Another object of the invention is to provide a control means for a diverter apparatus as described above which is especially adapted for remote operation thereof.

Another object of the invention is to provide in combination with a material handling apparatus such as the livestock feeder, a diverter apparatus movable between first and second positions and means for selectively moving said diverter means between its first and second positions and including a stationary cam means disposed in the path of movement of the diverter means and moving cam means movable with said diverter means and cooperable to move said diverter means from its first to its second position, depending upon the condition of said stationary cam means.

Still another object of the invention is to provide a diverter means and control means therefor as described in the preceding object wherein the stationary cam means is operable between first and second operating positions, and in one of said operating positions is cooperable with the movable cam means to position the diverter means in one of its positions and in a second operating position is cooperable with the movable cam means to position the diverter in its other operating position.

These and other objects of the invention will become apparent upon reading the detailed description of the invention which follows.

BRIEF DESCRIPTION OF DRAWING

FIG. 1 is a longitudinal, partially schematic, view of a livestock feeder assembly embodying the present invention.

FIG. 2 is a transverse cross-sectional view of the feeder assembly taken generally along lines 2—2 of FIG. 1.

FIG. 3 is a fragmentary perspective view disclosing a part of the control apparatus which forms a part of this invention.

FIG. 4 is a fragmentary view disclosing the cooperation of two parts of the control apparatus in one position of the feeder assembly.

FIG. 5 is a simplified and partially schematic view, otherwise generally similar to FIG. 2, but disclosing the control apparatus in another of its operation conditions.

FIG. 6 is a schematic fragmentary view disclosing the cooperation of elements of the control apparatus as a diverter which forms a part of the invention is being moved from one of its positions to another.

FIG. 7 is a simplified transverse view generally similar to FIG. 5 but disclosing the diverter in the position it occupies after it completes the movement from one position to the other.

FIG. 8 is a fragmentary view, taken generally along line 8—8 of FIG. 1 and showing an end view of a diverter which is a part of the feeder apparatus.

DETAILED DESCRIPTION

Referring to the drawing, and particularly to FIGS. 1 and 2, there is disclosed a livestock feeder or the like including a fixed track 20 mounted above a feed bunk 21. Movably mounted on track 20 is a carriage 22 which is driven back and forth along the track by a drive means 23 which is located substantially midway along the length of the track. A stationary conveyor 24 is disposed above the carriage substantially at the mid point of the track to convey material to the carriage. As can better be seen in FIG. 2, track 20 comprises a pair of spaced parallel track members 20a and 20b each of which is preferably an angle member with a generally L-shaped cross-section. These track members are mounted on supporting posts 25 by appropriate mounting brackets 26 or the like. Posts 25 are shown suspended from above but they may also extend upward from the feed bunk or from the ground. Carriage 22 is mounted on track 20 by appropriate rollers or wheels 27. As can be seen in FIG. 2, carriage 22 is a generally trough-shaped member and on the inside it has a chain driven conveyor 28 which operates around a pair of sprockets disposed generally at opposite ends of the carriage. The drive means 23 includes a motor and appropriate means for drivingly connecting the motor to carriage 22. This drive means is mounted on a post 30 which extends upward at substantially the mid point of the bunk. (If desired, post 30 may be suspended from above.) Post 30 is connected by appropriate members to track members 20a and 20b as can best be seen in FIG. 2. The details of the structure of the feeder are not significant to the present invention and will not be described in detail. They are described in detail in the previously mentioned Buschbom et al patent application Ser. No. 8199. It is sufficient to say that carriage 22 is driven back and forth along track 20 from one end to the other. As it is driven back and forth along the track, the conveyor 28 which is mounted on the carriage moves with respect to the carriage. Feed or other material to be conveyed is deposited onto the carriage from stationary conveyor 24 at generally the mid point of the track. This material is then moved with respect to the carriage by the conveyor 28 and is dumped into the bunk from one end of the carriage or the other, depending upon the direction in which the carriage is moving.

As can be seen in FIG. 2, bunk 21 may be divided into two sections 21a and 21b by a central divider 21c which extends longitudinally of the bunk generally at the center thereof and directly underneath the feeder. In many instances the feed lot is divided into two separate sections or pens with one section on each side of the bunk so that the cattle in one lot eat from section 21a and those in another lot eat from section 21b. In order that the feed from the feeder may be deposited in a selected one of the sections 21a and 21b, a pair of diverters 31 and 32 have been mounted on carriage 22 adjacent opposite ends thereof and disposed underneath the position where the material is dumped by conveyor 28. The diverters are disposed so that the feed being dumped by the conveyor will first be deposited onto one of the diverters. Since these diverters are substantially identical and are mounted in a mirror-image relationship on opposite ends of the carriage, particular attention will be given to diverter 31, it being understood that the description applies equally well to diverter 32 unless otherwise indicated. Diverter 31 is mounted on the right-hand end of carriage 22 by appropriate means such as a series of legs 33 which are attached to the carriage by appropriate means (not shown). The ends of spaced pairs of legs 33 are connected by horizontal cross-bars 34. The diverter itself includes a generally pan-like member 35 with a flat bottom and a pair of outstanding sides 35a and ±b. Diverter pan member 35 is mounted transversely on carriage 22 and is rigidly mounted on an axle 36 which extends generally parallel to the direction of movement of the carriage on the track and is disposed generally along the center line of the feeder. Axle 36 is journalled in cross-bars 34. Diverter pan 35 is rotatable with axle 36 about the axis thereof between the two positions disclosed in FIGS. 2 and 7. In the position of FIG. 2, it guides the material into section 21b of the bunk while in the position disclosed in FIG. 7 it guides the material into section 21a of the bunk. The two end positions are determined by the abutment of a tab 37 with cross-bar 34 at one end of the diverter. Tab 37 is fixed to pan 35 or to axle 36 and extends downward therefrom, generally normal to the bottom of the pan. At a point below crossnbar 34, tab 37 is bent at a right angle and extends outwardly under the cross-bar. At its outer end tab 37 has attached to it a spring 38 which extends upward and is connected to the carriage. This spring is maintained under tension and acts as an over-center spring maintaining pan 35 in one or the other of two positions on opposite sides of center. The outwardly extending end of tab 37 abuts cross-bar 34 in either of these end positions. Diverter 32 is generally similar and is mounted from carriage 22 by legs 133 connected in pairs by cross-bars 134. It has a pan 135 and is rotatable with an axle 136 which is generally parallel to and in alignment with axle 36. The structure may also be such that the end positions of pans 35 and 135 are determined by abutment of the ends of the pans with the side of carriage 22, instead of by abutment of tab 37 with cross-bar 34. This will require that the pans be made longer and/or that the legs 33 be shortened somewhat.

Fixed to the inner end of axle 36 is a cam member 40 which will be referred to as a movable cam member in that it moves with diverter 31. Member 40 is formed from a circular disc that has a 90° bend along a chord which is slightly offset from the center. The larger portion 41a of the disc forms a vertical surface mounted normal to axle 36 and with axle 36 extending through the center of the disc. This vertical portion 40a may be considered as a back cam surface while the smaller portion 41b of the disc provides what may be known as a bottom cam surface. An inverted V-shaped member 41 encloses the end of shaft 36 which extends through back surface 40a and has the ends of its legs secured to surface 40b and with its apex extending upward therefrom and with one edge of each of the legs of the V secured to the back cam surface 40a. Member 41 acts as a guide or divider member and its purpose will be described in greater detail hereinafter. An identical movable cam member 140 is mounted on axle 136 which is fixed to diverter 32 at the left-hand end of the carriage.

Mounted on the stand for the drive means 23 is a stationary cam means 50 which is cooperable with the two movable cam means. A channel member 51 is secured to the stand for the drive means 23 and extends transversely to the track and carriage. Pivotly mounted substantially on the center line of the carriage, and about a pivot pin 52 which extends parallel to the direction of movement of the carriage, is a bracket 53 which extends from the underside of channel member 51. Bracket 53 has pivotly mounted thereon a pair of oppositely directed cam fingers 54 and 55. Cam finger 54 is pivoted about a pivot pin 56 while finger 55 is pivoted about a pin 57. Pins 56 and 57 extend through bracket 53 generally normal to pivot pin 52. It will be appreciated that if bracket 53 is permitted to hang generally vertically from pin 52, then fingers 54 and 55 will pivot about generally horizontal axes. Fingers 54 and 55 are disposed so that they extend downwardly at an angle of approximately 45° from the horizontal as can perhaps best be seen in FIG. 1. They are urged to this position by springs 60 and 61 acting upon fingers 54 and 55, respectively. These springs will yield to permit the fingers to be moved toward each other, that is to a position when they will extend downward from bracket 53. The ends of fingers 54 and 55 may be bent slightly so that they extend almost horizontally and outward almost parallel to the track.

A bracket 62 is secured to one side of bracket 53 and extends generally normal thereto. This bracket may extend on the inside of channel member 51 to define the limit of movement of bracket 53 in one direction about pin 52. In order to permit calibration of the device to accurately position fingers 54 and 55, an adjustable screw 62a may be threaded into bracket 62 and it then abuts the inside of channel member 51. Also, bracket 62 has secured thereto one end of a spring 63 the other end of which is secured to a part of the supporting structure for the drive means. This spring urges bracket 53 to the end position defined by the abutment of the screw in bracket 62 with channel member 51. This is substantially the position shown in FIG. 2. Also mounted on channel member 51 is an actuator 65 which preferably is remotely operable. It may be a solenoid or the like but the specific type of actuator is not particularly significant. It is essential only that actuator 65 have a retractable means 66, such as a short piece of chain, cable or the like which is also attached to bracket 53. Actuator 65 may be energized to overcome spring 63 and to pivot bracket 53, and thereby cam fingers 54 and 55, about pin 52, in a direction toward actuator 65. This moves the cam fingers to the position shown in FIGS. 5, 6 and 7. Thus, spring 63 urges the cam fingers to a normal position, as shown in FIG. 2, while actuator 65 overcomes the spring and moves it to a second operating position which is shown in FIGS. 5, 6 and 7.

Cam finger 54 is disposed for cooperation with movable cam 40 and cam finger 55 for cooperation with movable cam 140. The end of cam finger 54 is disposed so it will always engage cam 40 above the bottom surface 40b. When it is in its normal position (actuator 65 de-energized) finger 54 will be disposed on the right-hand side (when viewed as in FIGS. 2, 5, 6 and 7) of guide 41 and axle 36 and when actuator 65 is energized, finger 54 will be disposed on the left-hand side of guide 41 and axle 36.

The manner in which the control means including the movable and the stationary cam apparatus operates can best be understood by referring to the various fingers. In FIG. 1 and FIG. 2 the diverter is disclosed in a position where it will deliver feed into bunk section 21b. Actuator 65 is de-energized so that the stationary cam means occupies its normal position, the position determined by the bias of spring 63. Thus, finger 54 occupies the position disclosed in FIG. 2 as carriage 22 moves to the left, toward the center of the track, and movable cam 40 approaches it. FIG. 1 discloses finger 54 in its extended position to which it is urged by spring 60. FIG. 4 discloses the finger moved to a position which it occupies when the carriage is moved all the way to the left. In this position finger 54 has moved almost to the vertical position and the end of the finger has moved through an arc generally downwardly and toward the center of the device. However, this does not affect the angular position of movable cam 40 since finger 54 was on the right-hand side of axle 36 and simply moved downward as back surface 40a engaged it.

When it is desired to move the diverters to their other position, actuator 65 is energized by operating a simple switch 75 which may be mounted at one end of the track or at some other appropriate place where it will be convenient for the operator. This energizes actuator 65 and the fingers are moved to the operating position disclosed in FIG. 5. Now as movable cam 40 approaches finger 54, the end of finger 54 is disposed on the left-hand side of axle 36 and guide 41. As they engage each other finger 54 will engage first back cam surface 40a but then will also engage the top surface of guide 41 and/or the upper surface of bottom cam surface 40b and, as the carriage continues to move to the left, and finger 54 moves downwardly through an arc, it will force cam 40 to rotate in a counter-clockwise direction (as seen in FIG. 5) and to thereby rotate with it diverter 31, moving it from one position to the other. FIG. 6 discloses somewhat schematically the relationship as movable cam member 40 is partially moved from one to other of its end positions. FIG. 7 discloses the position of the cam members after movable cam 40 has moved all the way to its second end position and diverter 31 is now in a position where it will direct feed into section 21a of the bunk. As indicated, the diverter is provided with over-center spring 38 so that once it reaches the position which it will occupy when the cam is in FIG. 6 (just over-center), it will automatically move to the position disclosed in FIG. 7. Now, actuator 65 remains actuated so long as the feeder is operating and switch 75 is left in the energized position. Thus finger 54 is maintained in a position where it will be on the left-hand side of axle 36 every time that movable cam 40 approaches it. Now finger 54 will simply engage back cam surface 40a and be moved downwardly as carriage 22 moves to the left but it will not affect the position of the movable cam or the diverter until such time as the actuator 65 is de-energized.

When actuator 65 is de-energized spring 63 will again pivot bracket 53, moving the cam fingers so that the end of finger 54 will again be disposed on the right-hand side of axle 36. Now when the carriage moves to the left, the end of finger 54 will engage first the back cam surface 40a of the movable cam but then will engage the upper surface of guide 41 and/or bottom surface 40b and will force cam 40 to rotate in a clockwise direction as the carriage continues to move toward the center of the track. This will cause the diverter and movable cam 40 to be moved again to the position disclosed in FIG. 2.

As indicated previously, movable cam members 40 and 140 are substantially identical as are cam fingers 54 and 55. Cam fingers 54 and 55 move about pin 52 simultaneously so that the cooperation between finger 54 and movable cam member 40 described above applies equally to the cooperation between finger 55 and movable cam 140. It will be noted that the arrangement is such that diverters 31 and 32 will always be in a position where they both deliver the feed to the same section of the bunk.

The specific type of actuator utilized is not essential, it being only required that a relatively small amount of translational movement be provided when it is energized and that it be such that it may remain for a period of time in the energized or actuated position. In one embodiment, a solenoid device has been found very satisfactory in that it is relatively inexpensive and yet will provide a substantial force to move the fingers of the stationary cam apparatus to the actuated position and can remain actuated for relatively long periods without damage.

From the foregoing it can be seen that this invention provides a relatively simple means for operating diverter members utilized in connection with a cattle feeding apparatus or the like. The control apparatus for moving the diverters is relatively simple and inexpensive to manufacture or install. It is especially adaptable for remote control operation as by use of a remotely located electrical switch to operate actuator 65. The cooperation between the fixed and the movable cam means is relatively simple and positive. When the fingers of the stationary cam means are placed in one of their operating positions, cooperation between the fingers and the movable cam members cause the diverter to be moved the next time that the particular diverter moves to the center position of the feeder. Thereafter, until the finger is moved to its other operating position, it does not interfere with the operation of the feeder nor does it affect the position of the diverter.

The structure has been described as used in connection with a particular type of animal feeder. While this is an important application for the invention, it will be appreciated that it may also be utilized in connection with various other types of material handling apparatus. Also, it will be appreciated that while a single embodiment of the invention has been disclosed, various modifications may become apparent to those skilled in the art in view of this disclosure. Therefore, it is to be understood that the description herein is by way of illustration only and that the invention is to be limited solely by the scope of the appended claims.

The embodiments of the invention in which an exclusive property or right is claimed are defined as follows:

1. Material handling apparatus comprising: carriage means movable along a path of travel and adapted to discharge material along said path of travel, diverter means movable with said carriage means and disposed so that material discharged from said carriage means is discharged onto said diverter means, means mounting said diverter means for movement between first and second positions wherein it directs material discharged thereonto to one or the other of two positions relative to the carriage means, cam means including first and second cooperating cam means, said second cam means having a member selectively movable to a first operating position and to a second operating position, means mounting said second cam means in a stationary position with respect to the path of travel of the carriage means, said first cam means being movable with said diverter means along said path and being operably connected to said diverter means, said first and second cam means being disposed so that they intersect and engage at a predetermined position of said carriage and diverter means along the path of travel, and said second cam means is constructed and disposed for cooperation with the member of the first cam means whereby cooperation between said second cam means and the member when the member is in the first operating position effects movement of said diverter from the first to the second of its positions and cooperation between said second cam means and the member when the member is in the second operating position effects movement of said diverter from the second to the first of its positions.

2. The apparatus of claim 1 including actuator means operably connected to said second cam means and operable to selectively move said member to its first operating position and to its second operating position.

3. Material handling apparatus comprising: carriage means movable along a path of travel and adapted to discharge material along said path of travel, diverter means movable with said carriage means and is disposed so that material discharged from said carriage means is discharged onto said diverter means, means mounting said diverter means for movement between first and second positions wherein the diverter means directs material discharged thereonto to one or the other of two positions relative to the carriage means, cam means including first and second cooperating cam means, said first cam means including a cam member movable generally laterally of the path of travel between first and second operating positions, said second cam means being movable with said diverter means along said path and being operably connected to said diverter means, said second cam means includes a follower member movable with said diverter means along the path of travel, said follower member being rotatable between first and second positions and about a given axis, said follower member having a first follower surface disposed generally on one side of said axis and a second follower surface disposed generally on the other side of said axis, said cam member being engageable with the first follower surface when said cam member is in its first operative position and being engageable with the second follower surface when said cam member is in its second operative position, said first and second cam means being disposed so that they intersect and engage at a predetermined position of said carriage and diverter means along the path of travel to move said diverter means from one of its positions to the other position.

4. The apparatus of claim 3 wherein the cam member and follower surface cooperate upon engagement of said cam member with said first follower surface to move said follower member from its first to its second angular position and are effective upon engagement of said cam member, when in its second operative position, with said second follower surface to move said follower member from its second angular position to its first angular position, and wherein there is provided means operably connecting said follower member and said diverter means whereby movement thereof between its first and second angular position results in movement of said diverter means between its first and its second position.

5. The apparatus of claim 4 wherein said cam member and said follower surfaces are constructed and arranged so that engagement of said cam member in its first operative position and the first follower surface when said follower is in its second position results in no angular movement of said follower member and wherein engagement between said cam member in its second operative position, with said second follower surface when the follower member is in its first angular position, results in no angular movement of said follower member.

6. The apparatus of claim 4 further including actuating means operably connected to said cam member and operable between first and second positions to move said cam member between its first and second operative positions, respectively, and including control means for selectively operating said actuator means between said first and second positions.

7. The apparatus of claim 6 wherein said control means is located remotely from said cam means.

8. The apparatus of claim 6 wherein said actuating means includes spring means urging said cam means to said first position and electrically operable means energizable to move said cam means to said second operative position in opposition to said spring means and for maintaining said cam means in said second position.

9. Material handling apparatus comprising: carriage means movable along a path of travel and adapted to discharge material along said path of travel, diverter means movable with said carriage means and disposed so that material discharged from said carriage means id discharged onto said diverter means, means mounting said diverter means for movement between first and second positions wherein it directs material discharged thereonto to one or the other of two positions relative to the carriage means, cam means including first and second cooperating cam means, said first cam means being stationary with respect to the path of travel, said second cam means being movable with said diverter means along said path and being operably connected to said diverter means, said first and second cam means being disposed so that they intersect and engage at a predetermined position of said carriage and diverter means along the path of travel, and said cam means being cooperable upon engagement of said first and second cam means to move said diverter means from one of its said positions to the other, said movable cam means comprises a follower member rotatable about a given axis, said follower member having first and second follower surfaces generally symmetrically disposed about said axis, said stationary cam means comprises a cam member which is stationary along the path of travel of the carriage, diverter and follower member but is movable laterally with respect thereto between first and second positions, said cam member being cooperable with said first follower surface when in one of said positions and cooperable with the second follower surface when in the other of said positions.

10. The apparatus of claim 9 wherein said carriage means is movable back and forth along a fixed track defining the path of travel thereof, and said stationary cam means is mounted in fixed relationship with respect to said track in the path of the movable cam means.

11. The apparatus of claim 9 including a second similar diverter means movable with said carriage means and spaced from the first diverter means in the direction of travel therealong, said second diverter means also including moving cam means associated therewith for moving said second diverter means between first and second positions, stationary cam means cooperable with the movable cam means which is associated with said second diverter means, and said first and second stationary cam means being mounted substantially together and substantially at the center of the path of travel of said carriage means whereby said first stationary cam means is engaged by the first movable cam means upon movement of the carriage substantially to its limit of movement in one direction along the path and said second stationary cam means is engaged by the cooperating second movable cam means upon movement of the carriage to substantially its other limit of movement in the opposite direction of travel.

12. In an animal feeder or the like of the type including a carriage movable along a fixed track mounted above a feed bunk which is longitudinally separated into two parts providing separated bunks extending generally parallel to and on opposite sides of the track, the carriage being adapted to discharge feed into the bunk and including diverter means movable with the carriage and disposed so that feed discharged from the carriage is discharged onto the diverter means, the diverter means being movable between first and second positions for directing the feed to either the first or second bunk area, the improvement comprising: first movable cam means rotatable between first and second positions about a given axis and movable with the diverter means and the carriage along the track, the movable cam means being operably connected to the diverter whereby angular movement of the movable cam means between first and second angular positions effects movement of the diverter between its first and second positions, second cam means mounted in a stationary position with respect to the direction of travel of the movable cam means, said second cam means movable generally laterally relative to said direction of travel between first and second operating positions, said first and second cam means cooperating to move said first cam means from its first to its second angular position when said second cam means is disposed in its first operative position and said second and first cam means cooperating upon engagement thereof to move said first cam means to its second angular position when said second cam means is disposed in its second operative position.

13. The apparatus of claim 12 wherein the movable and second cam means are constructed and arranged so that they engage each other without changing the angular position of said movable cam means when the movable cam means is in its second position and said second cam means is in its first operative position and when the movable cam means is in its first angular position and the second cam means is in its second operative position.

14. The apparatus of claim 13 wherein the feeder discharges feed from positions substantially at opposite ends of the carriage as it moves back and forth along the track and wherein the apparatus includes a diverter means disposed adjacent each of the said ends of the carriage, each of said diverters having associated therewith a movable cam means and each of said movable cam means being cooperable with a separate second cam means, the separate second cam means being disposed substantially together and generally at the mid point of travel of the carriage along the track.

15. The apparatus of claim 12 including: actuating means operably connected to the second cam means operable to selectively move the second cam means to its first and second operating positions.

16. The apparatus of claim 15 including: control means for selectively operating said actuator means.

17. The apparatus of claim 1 including: a second diverter means movable with said carriage means and spaced from the first diverter means in the direction of the path of travel of the carriage means, first cam means associated with the second diverter means, said second diverter means movable between first and second positions, second cam means cooperating with the first cam means associated with the second diverter means for moving the second diverter means between its selectively first and second positions and said second cam means for the first and second diverter means being mounted substantially together and substantially at the center of the path of travel of said carriage means.

* * * * *

PO-1050
(5/69)

UNITED STATES PATENT OFFICE
CERTIFICATE OF CORRECTION

Patent No. 3,695,234      Dated October 3, 1972

Inventor(s) Floyd E. Buschbom et al

It is certified that error appears in the above-identified patent and that said Letters Patent are hereby corrected as shown below:

Column 4, line 53, "$\pm b$" should be --35b--.

Column 5, line 2, "crossnbar" should be -- cross-bar--.

Column 6, line 47, "fingers" should be --figures--.

Column 9, line 61, after "follower" --member-- is omitted.

Column 10, line 21, "id" should be --is--.

Signed and sealed this 27th day of March 1973.

(SEAL)
Attest:

EDWARD M. FLETCHER, JR.      ROBERT GOTTSCHALK
Attesting Officer      Commissioner of Patents